(12) United States Patent
Cassiau et al.

(10) Patent No.: US 12,184,457 B2
(45) Date of Patent: Dec. 31, 2024

(54) PROCESSING METHOD IN A WIRELESS TELECOMMUNICATIONS RECEIVER RECEIVING A DIGITALLY MODULATED SINGLE-CARRIER SIGNAL, ASSOCIATED WIRELESS TELECOMMUNICATIONS RECEIVER AND ASSOCIATED COMPUTER PROGRAM

(71) Applicant: COMMISSARIAT A L'ENERGIE ATOMIQUE ET AUX ENERGIES ALTERNATIVES, Paris (FR)

(72) Inventors: Nicolas Cassiau, Grenoble (FR); Marc Laugeois, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 132 days.

(21) Appl. No.: 18/094,316

(22) Filed: Jan. 6, 2023

(65) Prior Publication Data

US 2023/0231748 A1 Jul. 20, 2023

(30) Foreign Application Priority Data

Jan. 18, 2022 (FR) ..................................... 2200411

(51) Int. Cl.
*H03H 7/30* (2006.01)
*H03H 7/40* (2006.01)
(Continued)

(52) U.S. Cl.
CPC .. *H04L 25/03197* (2013.01); *H04L 25/03159* (2013.01)

(58) Field of Classification Search
CPC ......... H04L 25/03197; H04L 25/03159; H04L 25/03057; H04L 25/03; H04L 25/03891; H04B 3/142; H04B 10/616; H04B 17/336
(Continued)

(56) References Cited

U.S. PATENT DOCUMENTS 6,067,319 A * 5/2000 Copeland .......... H04L 25/03057
375/348
6,651,078 B1 11/2003 Gershon et al.
(Continued)

OTHER PUBLICATIONS

Gheorghiu, et al., "Implementation of single carrier packet transmission with frequency domain equalization", 2008 IEEE 68th Vehicular Technology Conference, 2008.

*Primary Examiner* — Phuong Phu
(74) *Attorney, Agent, or Firm* — BakerHostetler

(57) ABSTRACT

A processing method in a wireless telecommunications receiver receiving a digitally modulated single-carrier signal includes, between a matched filter, in the time domain, operating at a frequency drx×B and a frequency equalizer, operating at the frequency B, a decimation step comprising: i/extracting, from a filtered signal frame, a first sequence of samples for aiding the decimation and having the same power; and a second sequence of payload samples intended to be equalized; ii/estimating the variance in the power of each of the drx decimation phases of the first sequence and identifying the $n^{th}$ decimation phase associated with the minimum variance; iii/decimating the second sequence by selecting the $n^{th}$ decimation phase of the second sequence and supplying the decimation phase at the input of the frequency equalizer.

10 Claims, 8 Drawing Sheets

(51) Int. Cl.
 *H03K 5/159* (2006.01)
 *H04L 25/03* (2006.01)
(58) Field of Classification Search
 USPC ............... 375/229, 346, 350, 230, 232, 348
 See application file for complete search history.

(56) References Cited

U.S. PATENT DOCUMENTS

| | | | |
|---|---|---|---|
| 7,076,010 B1* | 7/2006 | Heidari | H04B 3/142 |
| | | | 375/232 |
| 7,949,040 B2* | 5/2011 | Yoshida | H04B 17/336 |
| | | | 455/296 |
| 9,667,455 B1* | 5/2017 | Levakov | H04L 25/03891 |
| 10,057,089 B2* | 8/2018 | Qu | H04L 25/03 |
| 2007/0071071 A1 | 3/2007 | Li et al. | |
| 2015/0372764 A1* | 12/2015 | Kaneda | H04B 10/616 |
| | | | 398/115 |

* cited by examiner

PROCESSING METHOD IN A WIRELESS TELECOMMUNICATIONS RECEIVER RECEIVING A DIGITALLY MODULATED SINGLE-CARRIER SIGNAL, ASSOCIATED WIRELESS TELECOMMUNICATIONS RECEIVER AND ASSOCIATED COMPUTER PROGRAM

CROSS-REFERENCE TO RELATED APPLICATION

This application claims priority to foreign French patent application No. FR 2200411, filed on Jan. 18, 2022, the disclosure of which is incorporated by reference in its entirety.

FIELD OF THE INVENTION

The invention lies in the field of single-carrier transmission with frequency equalization.

BACKGROUND

As Shown in FIG. 1, a Single-Carrier (SC) Wireless Telecommunications Chain Comprises a Single-Carrier Transmitter 50 Comprising:
- a binary source 51,
- a coding block 52 for "mapping" M bits to an analogue value in the complex plane in accordance with a digital modulation (for example, but without limitation, QAM, AKQ, FSK, PSK) defining a constellation of symbols;

$$T = \frac{1}{B}$$

is used to denote the rate of these complex symbols,
- a shaping filter 53 for limiting the band of the signal and inter-symbol interference (ISI),
- a transmission antenna 54 transmitting the filtered signal on the carrier;

and a receiver 60 comprising, in the case under consideration, notably:
- a reception antenna 61,
- a filter 62, and
- a decision member 63 for recovering the complex symbols, of FDE (frequency domain equalizer) type, the role of which is to estimate the parameters of the channel (notably frequency attenuations), to equalize the frequency of the frequency samples on the basis of the estimated channel parameters and to return to the time domain through an inverse Fourier transform operation. The use of an FDE equalizer 63 means having to frame the complex symbols, this grouping them into packets of N, the equalizer 63 operating on this packet size (cf. FIG. 2).

As may be seen in FIG. 1, the filtering at reception may be carried out either in the time domain (g(t)) or in the frequency domain (G(f)).

FIG. 2 shows electronic processing blocks of a receiver 60 with temporal filtering. The processing in the time domain includes the filtering and also the temporal synchronization of the data frame. With the frame being synchronized, implementing a discrete-time Fourier transform then makes it possible to carry out processing operations of channel estimation and equalization in the frequency domain. In the case of filtering in the time domain, N is a power of 2 and the discrete Fourier transform may use a fast architecture that exhibits a certain advantage with regard to computational and/or hardware complexity. Lastly, an inverse (discrete) Fourier transform supplies the samples equalized in the time domain at the symbol rate B. A final block has the role of correcting certain parameter phenomena inherent to a transmission chain, which will not be described further here.

The sampling at the input of the receiver requires a sampling frequency greater than B, while the equalization processing operation requires a sampling rate equal to B. The following paragraphs explain why this downsampling is problematic.

Condition of Perfect Detection:

This section explains how, in the receiver 60, to perfectly recover the symbols transmitted in the case of reception filtering in the time domain. The signal before provision to the decision member 63 is filtered by the impulse response filter g(t) (for example corresponding to the equivalent tx-rx filter in FIG. 3). The sampling at the period T produces the following impulse response:

$$g_T(t) = g(t) \Sigma_{k=-\infty}^{+\infty} \delta(t-kT) = \Sigma_{k=-\infty}^{+\infty} g(kT) \delta(t-kT)$$

In order to cancel out the inter-symbol interference (ISI), the signal sampled at the times kT must not contain contributions of the signal at other times. This condition is written:

$$g_T(t) = \delta(t)$$

In the frequency domain, this equality becomes:

$$TF\{g(t)\Sigma_{k=-\infty}^{+\infty}\delta(t-kT)\} = TF\{\delta(t)\}$$

The noteworthy identities $$TF\{\Sigma\delta(t-kT)\} = \frac{1}{T}\Sigma\delta\left(f - \frac{k}{T}\right) \text{ and } TF\{\delta(t)\} = 1$$

make it possible to write:

$$G(f) * \sum_{k=-\infty}^{+\infty} \delta\left(f - \frac{k}{T}\right) = 1$$

$$\frac{1}{T}\sum_{k=-\infty}^{+\infty} G\left(f - \frac{k}{T}\right) = 1$$

This condition shows that the spectrum of the shaping filter periodized to the symbol rate must be flat.

The rectangular filter (in terms of frequency) of band B complies with this condition. In the time domain, this filter is a sinc function, and its impulse response is infinite. It is therefore not possible to choose this filter as any truncation of its length would lead to a periodized spectrum that is not flat. Any other filter will have a band greater than B=1/T. It is therefore necessary to upsample the input signal before filtering it. The upsampling factor is denoted x and, hereinafter, it is chosen by way of example to be 1.5.

In order to avoid having to use excessively fast converters, the frequencies that are chosen are for example the lowest possible frequencies complying with the various criteria.

The filter is split, in the example under consideration now, into two, one part at transmission and the other at reception. It is then a root-raised-cosine (RRC) filter. Reference is made to matched filtering. FIG. 3 shows the upsampling, decimation (=downsampling) and equivalent tx-rx filtering of the transmission chain from FIG. 1, with the various sampling frequencies that are implemented (the "channel" section representing the radiofrequency propagation of the signal between the transmitter and the receiver, the block Tx BB, respectively Rx BB, representing the baseband processing carried out in the transmitter, respectively the receiver, while the block RF Tx, respectively RF Rx, represents the frequency transposition to the carrier frequency, respectively from the carrier frequency). Here, at the output of the transmitter, the sampling frequency is $$F_{s,tx} = B \times \frac{u_{tx}}{d_{tx}}.$$

At the receiver, an upsampling and then decimation chain is put in place in order ultimately to drop to the sampling rate B. This thus gives $$F_{s,rx} \times \frac{u_{rx}}{d_{rx}} = B.$$

The upsampling factor is $$x = \frac{u_{tx}}{d_{tx}} = \frac{d_{rx}}{u_{rx}},$$

with for example $u_{tx}=3$, $d_{tx}=2$, $u_{rx}=4$ and $d_{rx}=6$.

At transmission, the RRC tx filter is preceded by upsampling by $u_{tx}$ and followed by decimation by $d_{tx}$. At reception, upsampling by $u_{rx}$ is performed upstream of the RRC Rx filter; decimation by $d_{rx}$ is performed downstream of the RRC Rx filter.

FIG. 4 is an illustration of the frequency response of the "RRC tx+RRC rx" filter before decimation by $d_{rx}$. The frequencies shown in the figures are normalized with respect to B.

FIG. 5 shows the frequency response of the "RC tx+RC rx" filter after decimation by $d_{rx}$, i.e. corresponding to sampling at the nominal frequency B for various decimation phases.

Decimation phase is the name given to the signal resulting from a decimation of factor $d_{rx}$. There are $d_{rx}$ possible decimation phases (depending on the chosen decimation comb), just one being selected. Let $ech_0$, $ech_1$, ... $ech_n$ be the signal samples before decimation, the various possible decimation phases correspond to the various following subsets of samples (their rank in the numbering no. 1, ..., no. $d_{rx}$ of the phases is chosen arbitrarily):

phase no. 1 = {$ech_0$ modulo($d_{rx}$)} = {$ech_0$, $ech_{d_{rx}}$, $ech_{2d_{rx}}$, ...};

phase no. 2 = {$ech_1$ modulo($d_{rx}$)} = {$ech_1$, $ech_{1+d_{rx}}$, $ech_{1+2d_{rx}}$, ...};

phase no. 3 = {$ech_2$ modulo($d_{rx}$)} = {$ech_2$, $ech_{2+d_{rx}}$, $ech_{2+2d_{rx}}$, ...};

...

phase no. ($d_{rx}-1$) =

{$ech_{d_{rx}-2}$ modulo($d_{rx}$)} = {$ech_{d_{rx}-2}$, $ech_{2d_{rx}-2}$, $ech_{3d_{rx}-2}$, ...};

phase no. $d_{rx}$ = {$ech_{d_{rx}-1}$ modulo($d_{rx}$)} =

{$ech_{d_{rx}-1}$, $ech_{2d_{rx}-1}$, $ech_{3d_{rx}-1}$, ...};

With reference to FIG. 5: it is observed that one of the decimation phases that is shown gives a perfectly flat equivalent filter; the other phases that are shown exhibit a decrease in the response around $$\frac{B}{2},$$

the worst phase even creating a frequency gap. The further the optimum point is moved away from, the more the signal is degraded. An informed choice of the chosen decimation phase is therefore required. The following paragraph shows what causes this degradation.

Impact of the Decimation Phase

As illustrated in FIG. 3, the transmission/reception chain does not operate at the same frequency in the processing step. Let us compute the equivalent tx-rx filter.

First of all, it is necessary to compute the equivalent filter at the output of the module "RRC Rx". Let $g_{T_e}(t)$ be the equivalent RC filter sampled at $T_e$ with $T=T_e \times d_{rx}$ such that the RRC Rx output signal is upsampled by a factor $d_{rx}$.

$$g_{T_e}(t)=g(t)\Sigma_{k=-\infty}^{+\infty}\delta(t-mT_e)=\Sigma_{k=-\infty}^{+\infty}g(mT_e)\cdot\delta(t-mT_e)$$

The spectrum of this filter is:

$$TF\{g_{T_e}(t)\}=F_e\Sigma_{k=-\infty}^{+\infty}G(f-mF_e)$$

Let $g_T(t)$ be the filter $g_{T_e}(t)$ decimated by $d_{rx}$ the sampling comb of which is shifted by $\Delta T_e$ with $\Delta \in [0; d_{rx}[$. This is tantamount to sampling $g_{T_e}(t)$ at $T+\Delta T_e$.

$$g_T(t)=\Sigma_{k=-\infty}^{+\infty}g_{T_e}(kT+\Delta T_e)\delta(t-kT-\Delta T_e)$$

(Note: in this step, it would be possible to add a temporal offset linked to the misalignments of the tx-rx sampling combs, but this does not contribute anything.)

Substituting $g_{T_e}$ for its expression gives:

$$g_T(t)=\Sigma_{k=-\infty}^{+\infty}[\Sigma_{k=-\infty}^{+\infty}g(mT_e)\delta(kT+\Delta T_e-mT_e)]\delta(t-kT-\Delta T_e)$$

$$g_T(t)=\Sigma_{k=-\infty}^{+\infty}[\Sigma_{k=-\infty}^{+\infty}g(mT_e)\cdot\delta((kd_{rx}+\Delta-m)T_e)]\delta(t-(kd_{rx}+\Delta)T_e)$$

Noting that $\delta((kd_{rx}+\Delta-m)T_e)=1$ when $m=kd_{rx}+\Delta$, 0 otherwise, this gives:

$$g_T(t)=\Sigma_{k=-\infty}^{+\infty}g((kd_{rx}+\Delta)T_e)\cdot(kd_{rx}+\Delta)T_e)$$

which may then also be written:

$$g_T(t) = g(t) \sum_{k=-\infty}^{+\infty} \delta(t - (k\ d_{rx} + \Delta)\ T_e)$$

Let us then compute the Fourier transform of this expression:

$$TF\{g_T(t)\} = TF\left\{g(t) \sum_{k=-\infty}^{+\infty} \delta(t - (k\ d_{rx} + \Delta)\ T_e)\right\}$$

$$TF\{g_T(t)\} = G(f) * TF\left\{g(t) \sum_{k=-\infty}^{+\infty} \delta(t - k\cdot d_{rx} - \Delta\ T_e)\right\}$$

If we denote $a(t)=\Sigma_{k=-\infty}^{+\infty}\delta(t-kd_{rx}T_e)$ then $\Sigma_{k=-\infty}^{+\infty}\delta(t-kd_{rx}T_e-\Delta T_e)=a(t-\Delta T_e)$ and $TF\{a(t-\Delta T_e)\}=TF\{a(t)\}e^{j2\pi\Delta T_e f}$ this therefore gives $$TF\{g_T(t)\} = \frac{1}{T}G(f) * \left[e^{-j2\pi\Delta T_e f} \sum_{k=-\infty}^{+\infty} \delta\left(f - \frac{k}{T}\right)\right]$$

$$TF\{g_T(t)\} = \frac{1}{T}G(f) * \left[e^{-j2\pi\Delta \frac{Tf}{d_{rx}}} \sum_{k=-\infty}^{+\infty} \delta\left(f - \frac{k}{T}\right)\right]$$

$$TF\{g_T(t)\} = \frac{1}{T}G(f) * \sum_{k=-\infty}^{+\infty} e^{-j2\pi\frac{\Delta k}{d_{rx}}} \delta\left(f - \frac{k}{T}\right)$$

Example 1

If $\Delta=0$ we find, as expected, the periodized spectrum.

$$TF\{g_T(t)\} = \frac{1}{T}G(f) * \left[\sum_{k=-\infty}^{+\infty} \delta\left(f - \frac{k}{T}\right)\right] = \frac{1}{T}\sum_{k=-\infty}^{+\infty} G\left(f - \frac{k}{T}\right)$$

Let us analyse the contributions for k=0 and k=1 in terms of $$f = \frac{B}{2}$$

having a bounded spectrum, the contribution in terms of $$f = \frac{B}{2}$$

involving only the 2 terms k=0 and k=1).

$$G\left(\frac{B}{2}\right) + G\left(\frac{B}{2} - B\right) = G\left(\frac{B}{2}\right) + G\left(-\frac{B}{2}\right) = 2G\left(\frac{B}{2}\right)$$

With the real filter therefore being symmetric, $$G\left(\frac{B}{2}\right) = G\left(-\frac{B}{2}\right),$$

this thus gives:

$$G\left(\frac{B}{2}\right) + G\left(\frac{B}{2} - B\right) = 2G\left(\frac{B}{2}\right)$$

And $\left\|G\left(\frac{B}{2}\right) + G\left(\frac{B}{2} - B\right)\right\|^2 = 4\left\|G\left(\frac{B}{2}\right)\right\|^2$, value equal to 1 if the filter is matched.

Example 2

Let us choose the following set of parameters:

$$\begin{cases} u_{tx} = 3 \\ d_{tx} = 2 \\ u_{rx} = 4 \\ d_{rx} = 6 \end{cases}$$

And $\Delta = 3$.

$$TF\{g_T(t)\} = \frac{1}{T}G(f) * \sum_{k=-\infty}^{+\infty} e^{-j\pi k} \delta\left(f - \frac{k}{T}\right)$$

Let us analyse the contributions for k=0 and k=1 in terms of $$f = \frac{B}{2}.$$

The sum or me two terms is zero as, since the filter is real, its frequency response is symmetric:

$$G\left(\frac{B}{2}\right) - G\left(\frac{B}{2} - B\right) = G\left(\frac{B}{2}\right) - G\left(-\frac{B}{2}\right) = 0$$

All of the decimation phases are thus not equivalent.

Example 3

Let us choose the following set of parameters:

$$\begin{cases} u_{tx} = 3 \\ d_{tx} = 2 \\ u_{rx} = 2 \\ d_{rx} = 3 \end{cases}$$

And $\Delta=1$.

$$TF\{g_T(t)\} = \frac{1}{T}G(f) * \sum_{k=-\infty}^{+\infty} e^{-j\pi\frac{k}{3}} \delta\left(f - \frac{k}{T}\right)$$

Let us analyse the contributions for k=0 and k=1 in terms of $$f = \frac{B}{2}.$$

The sum of the two terms is zero as, since the filter is real, its frequency response is symmetric:

$$G\left(\frac{B}{2}\right) + G\left(\frac{B}{2} - B\right)e^{-j\frac{2\pi}{3}} = G\left(\frac{B}{2}\right)\left(1 + e^{-j\frac{2\pi}{3}}\right)$$

But $$\left\|1 + e^{-j\frac{2\pi}{3}}\right\|^2 = 1.$$

The attenuation is therefore 6 dB with respect to $$2\,G\left(\frac{B}{2}\right).$$

A simulation chain has been coded and makes it possible to verify the impact of the choice of the decimation phase on the constellation equalized by the channel estimate.

One solution for dispensing with the choice of the downsampling sample is to implement the matched filter in the frequency domain. FIG. 2 then changes: the synchronization module again operates on a flow upsampled by a factor x. The discrete Fourier transform, currently of length N×x, is no longer able to use a fast architecture since, in the general case, x is not a power of 2. The channel estimation and the equalization continue to operate at the frequency B since they are placed after the decimation in the frequency domain. The decimation in the frequency domain consists in removing N×(x−1) carriers. Carrying out the reception filtering in the frequency domain is therefore not possible for the purposes of a hardware implementation (the FFT would not have a wavelength that is a power of two and therefore the DFT algorithm cannot be used). It is therefore necessary to implement the filter in the time domain.

In order to be able to use a DFT, it is necessary to carry out the reception filtering and the decimation in the time domain (see FIG. 2): the synchronization makes it possible to find the correct downsampling sample and the start of the frame. In Gheorghiu, V., Kameda, S., Takagi, T., Tsubouchi, K., & Adachi, F. (2008, September). Implementation of single carrier packet transmission with frequency domain equalization. In 2008 IEEE 68th Vehicular Technology Conference (pp. 1-5). IEEE, it is proposed to use a preamble dedicated to frame and sample synchronization. This preamble exhibits good correlation properties. With $d_{rx}$ the downsampling factor at the output of the filter, $d_{rx}$ correlators operate in parallel, the one that supplies the highest correlation value (exceeding a threshold) is selected and then gives the correct decimation sample.

The decimation phase could be chosen in the module for synchronizing the frame, as in Gheorghiu et al. However, this solution would exhibit 2 major drawbacks: the $d_{rx}$ correlators operating in parallel are extremely costly in terms of hardware resources when operating with large bands and the FFT is not necessarily a power of 2.

There is therefore a need to have an appropriate implementable solution for determining what decimation phase should be selected in a receiver of the type of the FDE receiver 60.

SUMMARY OF THE INVENTION

To this end, according to a first aspect, the present invention describes a processing method in a wireless telecommunications receiver receiving a digitally modulated single-carrier signal, said receiver comprising a processing chain comprising a matched filter designed to perform shaping filtering on the signal in the time domain and to operate at a frequency drx×B and a frequency equalizer designed to perform frequency equalization on the filtered signal and deduce the modulation symbols of the equalized signal and to operate at the frequency B, drx being strictly greater than 1;
said method implemented in the receiver comprising, between the filtering and the equalization, a step of decimating the filtered signal by a factor drx, said method implemented in the receiver being characterized in that said decimation of the filtered signal comprises the following steps:
i/extracting, from a filtered signal frame:
  a first sequence of samples, said samples being samples for aiding the decimation and having the same power; and
  a second sequence of samples, said samples being the payload samples intended to be equalized;
ii/estimating the variance in the power of each of the drx decimation phases of the first sequence of samples; comparing the estimated power variances with one another and identifying the decimation phase associated with the minimum variance, said identified phase being the $n^{th}$ phase, with $n \in \{0, 1, \ldots ; drx-1\}$;
iii/decimating the second sequence of samples by a factor drx, the samples at the sampling frequency equal to B and delivered at the output of said decimation step being those of the $n^{th}$ decimation phase of the second sequence;
iv/supplying, at the input of the frequency equalizer, said samples at the sampling frequency equal to B and delivered at the output of said decimation step.

Choosing the correct phase makes it possible to limit degradations of the signal and to improve symbol detection performance in the constellation and thus improves the bit error rate significantly.

In some embodiments, such a method will furthermore comprise at least one of the following features:
  steps i, ii, iii and iv are implemented in relation to each filtered signal frame;
  the samples of the first sequence result from a digital modulation of a first type and the samples of the second sequence result from a digital modulation of a second type different from the first type;
  steps ii and iii are implemented in parallel in a decimation block, in which:
    the first sequence of samples of the frame is supplied at the input of a first processing sub-chain computing the power of each of said samples, and then distributing the sequence of resulting powers into drx sequences each corresponding to a decimation phase, computing the variance of each sequence of powers and identifying the decimation phase, phase number n, having the lowest variance;
    in parallel, the second sequence of samples of the frame is supplied at the input of a second processing sub-chain distributing the second sequence into drx sequences each corresponding to a decimation phase and supplying said drx sequences at the input of a multiplexer selecting that one of said drx sequences, which will be supplied at the output of said decimation block to the equalizer, corresponding to decimation phase number n on the basis of the identifier, n, supplied to the multiplexer by the first processing sub-chain;
  the size of the first sequence of samples used in step i is selected prior to steps i to iv on the basis of the desired speed of the decimation step and of the desired quality of the equalization.

According to another aspect, the invention describes a computer program, intended to be stored in the memory of a wireless telecommunications receiver receiving a digitally modulated single-carrier signal, said receiver comprising a processing chain comprising a shaping filter for shaping the signal in the time domain, designed to perform shaping filtering on the signal and to operate at a frequency drx×B and a frequency equalizer designed to perform frequency equalization on the filtered signal and to operate at the frequency B, drx being strictly greater than 1, and furthermore comprising a microcomputer, said computer program comprising instructions that, when they are executed on the microcomputer, implement the steps of a method according to the first aspect of the invention.

According to another aspect, the invention describes a wireless telecommunications receiver designed to receive a digitally modulated single-carrier signal, said receiver comprising a processing chain comprising a matched filter designed to perform shaping filtering on the signal in the time domain and to operate at a frequency drx×B and a frequency equalizer designed to perform frequency equalization on the filtered signal and deduce the modulation symbols of the equalized signal and to operate at the frequency B, drx being strictly greater than 1;

the receiver comprising, between the matched filter and the equalizer, a decimation block designed to decimate the filtered signal by a factor drx, said receiver being characterized in that the decimation block is designed to perform the following operations:

i/said decimation block is designed to extract, from a filtered signal frame:
  a first sequence of samples, said samples being samples for aiding the decimation and having the same power; and
  a second sequence of samples, said samples being the payload samples intended to be equalized;

ii/said decimation block is designed to estimate the variance in the power of each of the drx decimation phases of the first sequence of samples; to compare the estimated power variances with one another and identify the decimation phase associated with the minimum variance, said identified phase being the $n^{th}$ phase, with n E {0, 1, . . . ; drx−1};

iii/said decimation block is designed to decimate the second sequence of samples by a factor drx, the samples at the sampling frequency equal to B and delivered at the output of said decimation step being those of the $n^{th}$ decimation phase of the second sequence;

iv/said decimation block is designed to supply, at the input of the frequency equalizer, said samples at the sampling frequency equal to B and delivered at the output of said decimation step.

In some embodiments, such a receiver will furthermore comprise at least one of the following features:
the decimation block is designed to perform the operations in relation to each filtered signal frame;
the samples of the first sequence result from a digital modulation of a first type and the samples of the second sequence result from a digital modulation of a second type different from the first type;
the decimation block comprises:
  a first processing sub-chain designed to receive, at input, the first sequence of samples of the frame, to compute the power of each of said samples, and then to distribute the sequence of resulting powers into drx sequences each corresponding to a decimation phase, to compute the variance of each sequence of powers and identify the decimation phase, phase number n, having the lowest variance;
  a second processing sub-chain designed to receive, at input, the second sequence of samples of the frame, to distribute the second sequence into drx sequences each corresponding to a decimation phase, said second chain comprising a multiplexer designed to receive, at input, said drx sequences, designed to receive an identifier, n, supplied by the first processing sub-chain, and designed to select that one of said drx sequences, which will be supplied at the output of said decimation block to the equalizer, corresponding to decimation phase number n equal to the identifier supplied by the first processing sub-chain; the first and second sequences being processed in parallel.

BRIEF DESCRIPTION OF THE DRAWINGS

The invention will be better understood and other features, details and advantages will become more clearly apparent on reading the following non-limiting description, and by virtue of the appended figures, which are given by way of example.

Identical references may be used in various figures to designate identical or comparable elements.

DETAILED DESCRIPTION

Figure 2:
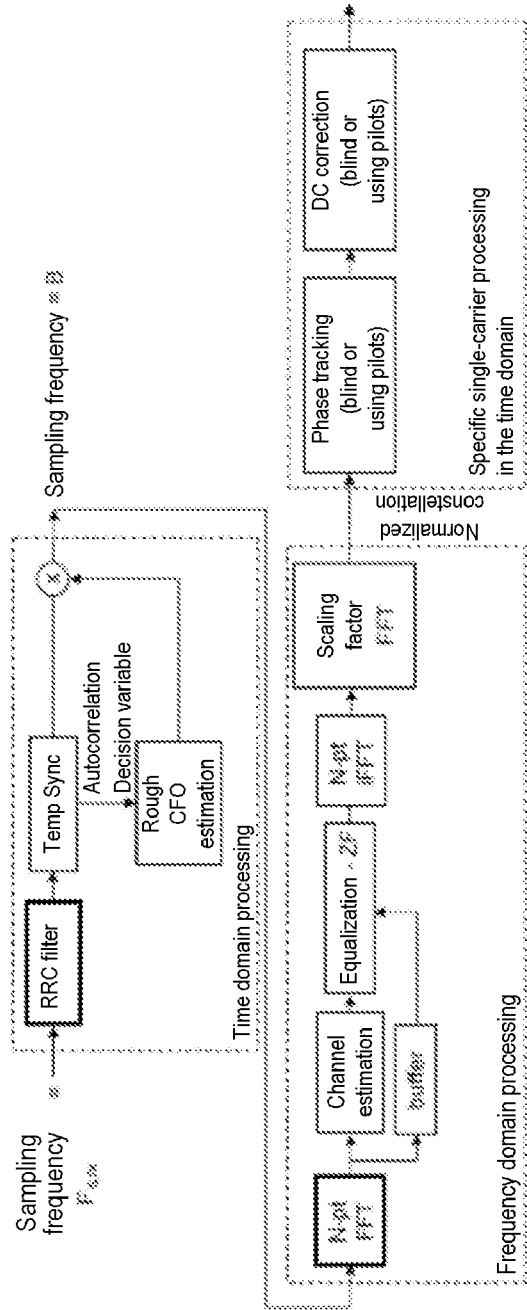
FIG. 2 shows the receiver of the single-carrier transmission chain from FIG. 1 in more detail.
Figure 3:
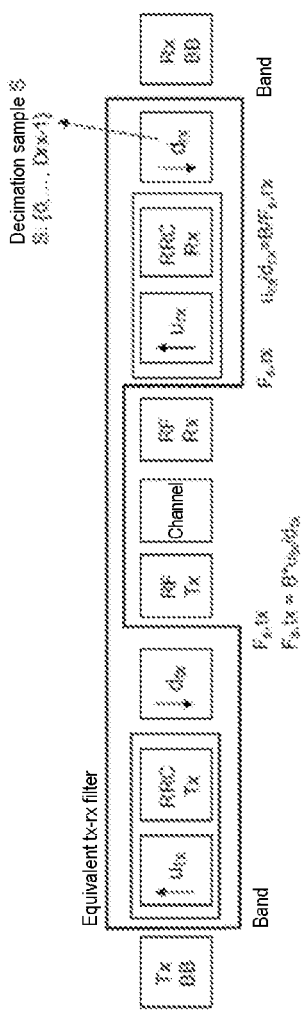
FIG. 3 shows the upsampling, decimation and equivalent tx-rx filtering operations implemented for example in a single-carrier transmission chain from the prior art as shown in FIG. 1.
Figure 4:
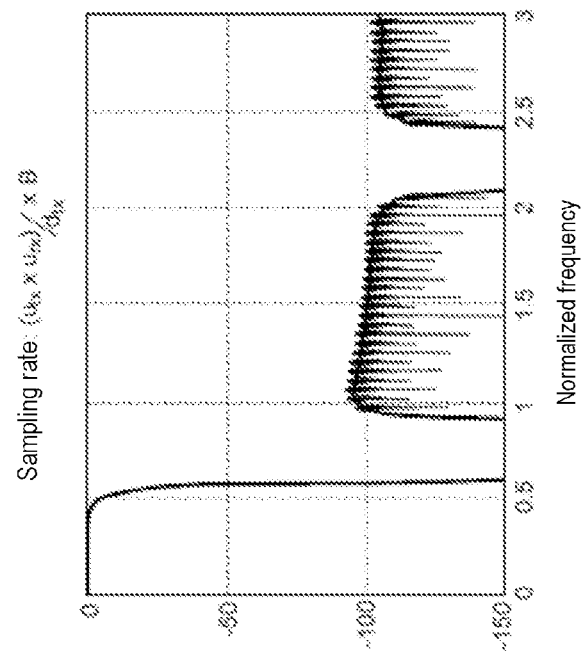
FIG. 4 shows the frequency response of the equivalent tx-rx filter at reception from FIG. 3 before decimation.
Figure 5:
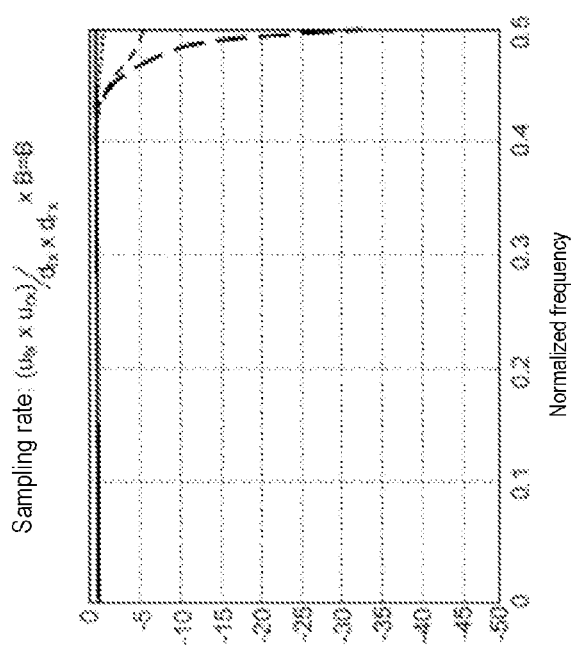
FIG. 5 shows the frequency response of the equivalent tx-rx filter at reception from FIG. 3 after decimation.
Figure 7:
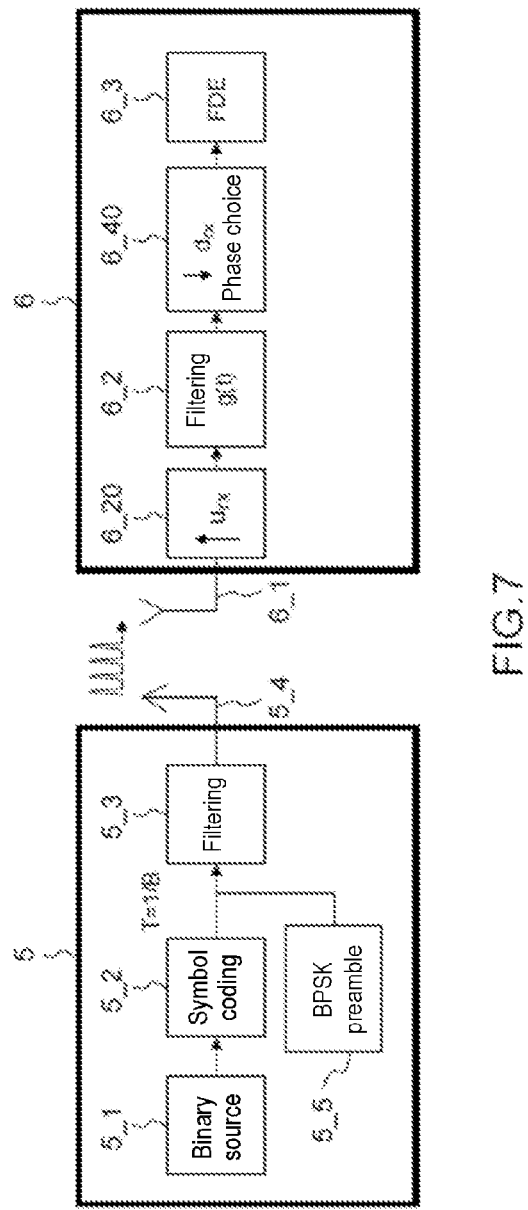
FIG. 7 shows a single-carrier transmission chain in one embodiment of the invention.

FIG. 7 shows a single-carrier transmission chain in one embodiment of the invention, taking into account the various sampling frequency constraints explained above and designed to allow selection of the decimation phase at reception. This transmission chain, in one embodiment, comprises a single-carrier transmitter 5 comprising:
  a binary source 5_1,
  a coding block 5_2 for "mapping" M bits to an analogue value in the complex plane in accordance with a digital modulation (for example, but without limitation, QAM, AKQ, FSK, PSK) defining a constellation of symbols;

$$T = \frac{1}{B}$$

is used to denote the rate of these complex symbols,
  a shaping filter 5_3 for limiting the band of the signal and inter-symbol interference (ISI),
  a transmission antenna 5_4 transmitting the filtered signal on the carrier; and
  a preamble insertion block 5_5;
and a receiver 6 comprising, in the case under consideration, notably:
  a reception antenna 6_1,
  a filter 6_2,
  a decision member 6_3 for recovering the complex symbols, of FDE (frequency domain equalizer) type, the role of which is to estimate the parameters of the channel (notably frequency attenuations), to equalize the frequency of the frequency samples on the basis of the estimated channel parameters and to return to the time domain through an inverse Fourier transform operation. The use of an FDE equalizer 63 means having to frame the complex symbols, this grouping them into packets of N, the equalizer 63 operating on this packet size (cf. FIG. 2);

an upsampling block 6_20 designed to upsample the received signal by a factor $u_{rx}$ such that the frequency of the upsampled signal that is supplied at the input of the filter 6_2 is strictly greater than B;

a decimation block 6_40, designed to downsample the signal by a factor $d_{rx}$, such that the frequency of the decimated signal supplied at the input of the FDE block 6_3 is equal to B, and designed to select the decimation phase by implementing a processing process in one mode of implementation of the invention.

Figure 1:
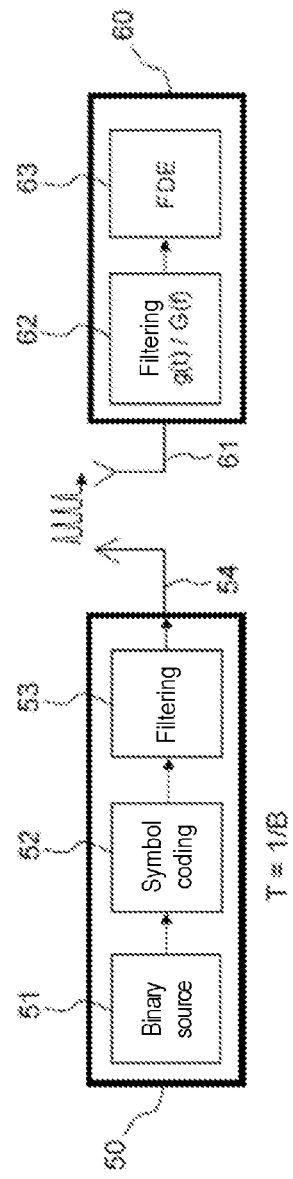
FIG. 1 shows a single-carrier transmission chain from the prior art.

The binary source 5_1, respectively the coding block 5_2, the shaping filter 5_3 and the transmission antenna 5_4 from FIG. 7 are similar to the source 51, respectively to the coding block 52, to the shaping filter 53 and to the transmission antenna 54 from FIG. 1.

The reception antenna 6_1, respectively the filter 6_2, and the decision member 6_3 from FIG. 7 are similar to the reception antenna 61, respectively the filter 62, and the decision member 63 from FIG. 1.

The preamble insertion block 5_5 in the transmitter 5 is designed to add, to each frame comprising the payload samples (i.e. obtained from the binary source), a preamble to the frame, the preamble comprising $N_p$ coded samples, for example coded using BPSK (i.e. {−1, +1}) or any other coding method with digital modulation delivering coded samples all of the same power, for example QPSK, 8-FSK, Zadof-Chu, etc. (the type of coding of the samples of the preamble is, in some embodiments of the invention, different from the coding of the binary source 5_1, the symbol frequency B however being common).

In the receiver 6, the decimation block 6_40 receives a signal resulting from the upsampling performed by the block 6_20 and from the filtering g(t) performed by the block 6_2 in the time domain. At the "RRC Rx" filter output, this signal contains $d_{rx}$ times more samples than required by the block FDE 6_3. The decimation block 6_40 is responsible for selecting the position of the sampling comb from among $d_{rx}$ positions and for supplying the corresponding downsampled signal at output.

Figure 8:
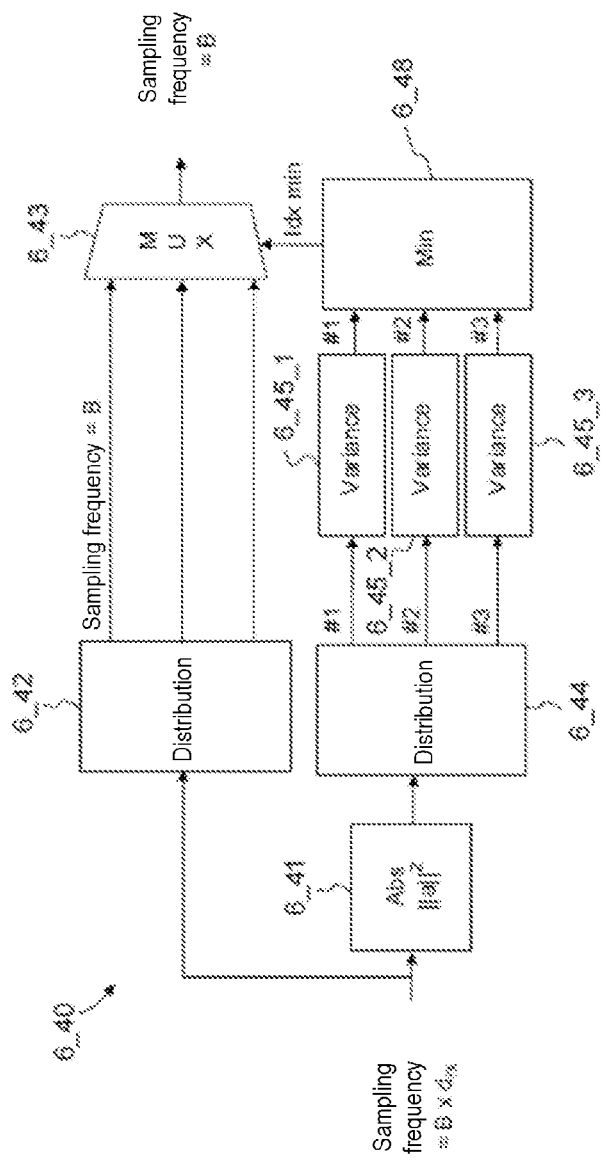
FIG. 8 shows the decimation block from FIG. 7 designed to select the decimation phase in one embodiment.

FIG. 8 shows, in one embodiment of the invention, the architecture of the decimation block 6_40 for $d_{rx}$=3. The decimation block 6_40 thus comprises two parallel processing chains.

The chain for processing the samples of the preamble of the same power comprises a power computation block 6_41, a block 6_44 for distributing the samples of the preamble into $d_{rx}$=3 parallel flows each corresponding to a respective decimation phase, $d_{rx}$=3 parallel variance computation blocks 6_45_1, 6_45_2, 6_45_3 and a block for determining a minimum 6_48.

The chain for processing the payload samples (resulting from the coding of the binary source) comprises a block 6_42 for distributing the payload samples into $d_{rx}$=3 parallel flows each corresponding to a respective decimation phase and a multiplexer 6_43, controlled by a control signal from the block for determining a minimum 6_48.

The decimation block 6_40 is designed to implement the process 100 described below with reference to FIG. 9. In one embodiment, the decimation block 6_40 comprises a computer and a memory storing software instructions that, when they are implemented on the computer, implement the steps described below with reference to FIG. 9.

Figure 9:
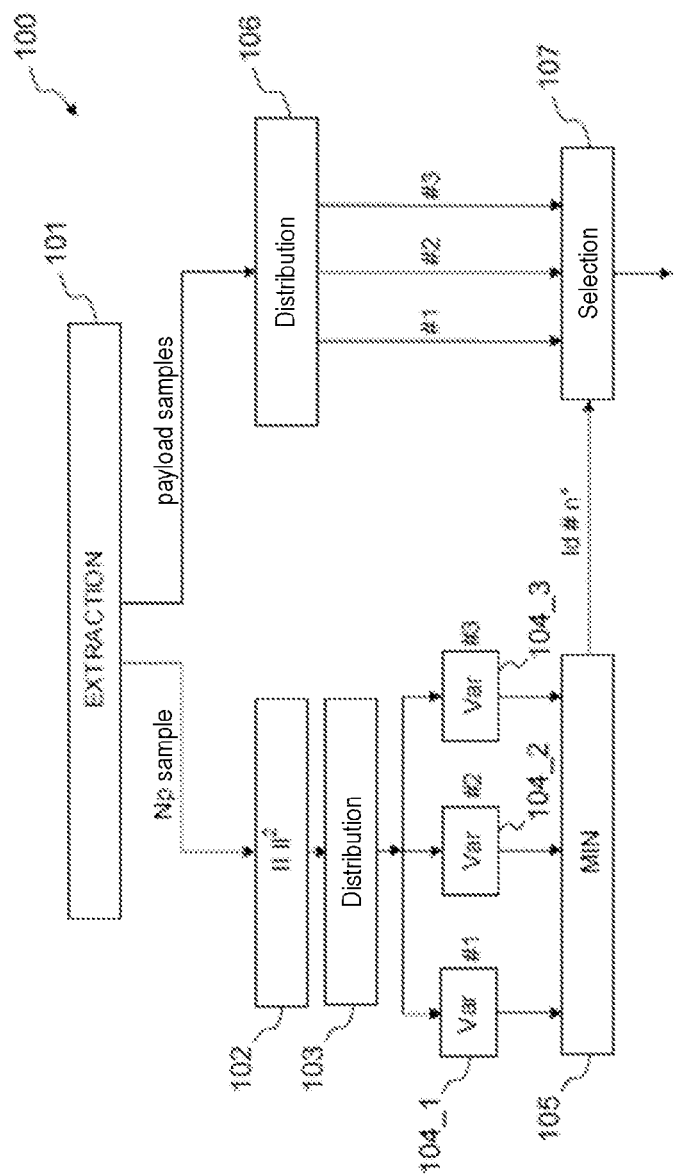
FIG. 9 shows a method in one embodiment of the invention.

Thus, as shown in FIG. 9, for each frame received by the decimation block 6_40, in a step 101, the $N_p$ coded samples of the same power of the preamble, at the sampling frequency B×$d_{rx}$, are extracted from the preamble of the frame by the decimation block 6_40 and are supplied at the input of the power computation block 6_41, whereas the payload samples of this frame, at the sampling frequency B×$d_{rx}$, are extracted from the frame by the decimation block 6_40 and are supplied at the input of the distribution block 6_42.

In a step 102, the power computation block 6_41 computes the power of the samples ($\| \|^2$) of the preamble and supplies the flow of power values to the distribution block 6_44.

In a step 103, the distribution block 6_44 distributes the flow of the powers of the samples of the preamble into $d_{rx}$=3 parallel flows each corresponding to a respective decimation phase no. i of the power samples of the preamble and supplies each decimation phase no. i to a respective variance computation block 6_45_i, i=1 to $d_{rx}$=3.

In steps 104_i, i=1, 2, 3, for example implemented in parallel, each variance computation block 6_45_i, i=1 to $d_{rx}$=3, computes the variance in the received powers and delivers the variance value computed for phase no. i to the block for determining a minimum 6_48.

In a step 105, the block for determining a minimum 6_48 compares the $d_{rx}$(=3) computed power variances with one another, selects the lowest one, identifies the phase corresponding to the lowest variance, called phase n here, and supplies the identifier "n" of the phase to the multiplexer 6_43.

In parallel with steps 102 to 105, in a step 106, the distribution block 6_42 distributes the flow of the payload samples into $d_{rx}$=3 parallel flows each corresponding to a respective decimation phase no. i of the payload samples and supplies each decimation phase no. i to the multiplexer 6_43.

In a step 107, the multiplexer 6_43 selects decimation phase no. n from among the $d_{rx}$ decimation phases received on its inputs, and it is only this decimation phase, and not the other phases, that is delivered at output of the decimation block 6_40 and supplied to the equalization block 6_3 (the samples in the preamble are not supplied; they do not contain any payload information to be decoded and are used in the embodiment under consideration only to identify the best decimation phase).

It is thus not the amplitude of the samples of the preamble that is used, but the power of each sample. This makes it possible to overcome any phase rotation of the samples.

In one embodiment, the optimum decimation phase is selected frame by frame, on the basis of the preamble of each filtered frame presented at the input of the decimation block.

In one embodiment, the length of the estimation (ensuring the precision of the estimation) is performed on $L_{var}$ samples, $L_{var}$ being strictly less than or equal to the length of the preamble $N_p$; in one embodiment, the value of $L_{var}$ and/or $N_p$ is selected before the method 100 is implemented on a frame, on the basis of the desired speed of the decimation step and of the desired quality of the equalization.

Figure 6:
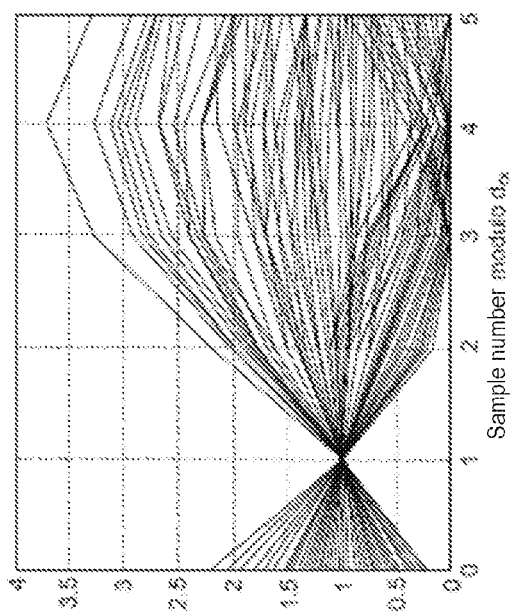
FIG. 6 shows the graph of the eye of the power, after RRC Rx.

FIG. 6 proposes a "graph of the eye" of the samples of the preamble, with the rank of the sample modulo $d_{rx}$ on the abscissa and the power of the sample on the ordinate. The invention makes it possible to find the decimation phase of the samples corresponding to a node of this graph. The best phase, here for example with $d_{rx}=6$, the one corresponding to the minimum variance, is phase #1 (the phases are numbered 0 to $d_{rx}-1$ in FIG. 6), the one having values that are all equal (here the ideal case, without white noise), the preamble containing only values of the same power.

The probability of false detection (i.e. choosing the phase that is not expected) while implementing the invention was studied for various SNR values and for two values of $L_{var}$. The probability is virtually zero for the SNRs of interest (for example >18 dB in the application).

The filter under consideration above is an RRC filter, but the invention remains applicable to any pair of matched filters.

The greater the number of coefficients of the filter, the more there will be a decimation phase that gives rise to a flat frequency response of the filter after decimation (as a function of the sampling frequency, of the band of the signal): a criterion with regard to the width of a flat area thus makes it possible, in one embodiment, to determine the number of coefficients of the filter.

The invention claimed is:

1. A processing method in a wireless telecommunications receiver receiving a digitally modulated single-carrier signal, said receiver comprising a processing chain comprising a matched filter designed to perform shaping filtering on the signal in the time domain and to operate at a frequency drx×B and a frequency equalizer designed to perform frequency equalization on the filtered signal and deduce the modulation symbols of the equalized signal and to operate at the frequency B, drx being strictly greater than 1; said method implemented in the receiver comprising, between the filtering and the equalization, a step of decimating the filtered signal by a factor drx, said method implemented in the receiver wherein said decimation of the filtered signal comprises the following steps:
   i/ extracting, from a filtered signal frame:
      a first sequence of samples, said samples being samples for aiding the decimation and having the same power; and
      a second sequence of samples, said samples being the payload samples intended to be equalized;
   ii/ estimating the variance in the power of each of the drx decimation phases of the first sequence of samples; comparing the estimated power variances with one another and identifying the decimation phase associated with the minimum variance, said identified phase being the $n^{th}$ phase, with $n \in \{0, 1, \ldots ; drx-1\}$;
   iii/ decimating the second sequence of samples by a factor drx, the samples at the sampling frequency equal to B and delivered at the output of said decimation step being those of the $n^{th}$ decimation phase of the second sequence;
   iv/ supplying, at the input of the frequency equalizer, said samples at the sampling frequency equal to B and delivered at the output of said decimation step.

2. The processing method in a wireless telecommunications receiver according to claim 1, wherein steps i, ii, iii and iv are implemented in relation to each filtered signal frame.

3. The processing method in a wireless telecommunications receiver according to claim 1, wherein the samples of the first sequence result from a digital modulation of a first type and the samples of the second sequence result from a digital modulation of a second type different from the first type.

4. The processing method in a wireless telecommunications receiver according to claim 1, wherein steps ii and iii are implemented in parallel in a decimation block, wherein:
   the first sequence of samples of the frame is supplied at the input of a first processing sub-chain computing the power of each of said samples, and then distributing the sequence of resulting powers into drx sequences each corresponding to a decimation phase, computing the variance of each sequence of powers and identifying the decimation phase, phase number n, having the lowest variance;
   in parallel, the second sequence of samples of the frame is supplied at the input of a second processing sub-chain distributing the second sequence into drx sequences each corresponding to a decimation phase and supplying said drx sequences at the input of a multiplexer selecting that one of said drx sequences, which will be supplied at the output of said decimation block to the equalizer, corresponding to decimation phase number n on the basis of the identifier, n, supplied to the multiplexer by the first processing sub-chain.

5. The processing method in a wireless telecommunications receiver according to claim 1, wherein the size of the first sequence of samples used in step i is selected prior to steps i to iv on the basis of the desired speed of the decimation step and of the desired quality of the equalization.

6. A non-transitory computer-readable storage medium storing instructions for a computer program, stored in the memory of a wireless telecommunications receiver receiving a digitally modulated single-carrier signal, said receiver comprising a processing chain comprising a shaping filter for shaping the signal in the time domain, designed to perform shaping filtering on the signal and to operate at a frequency drx×B and a frequency equalizer designed to perform frequency equalization on the filtered signal and to operate at the frequency B, drx being strictly greater than 1, and furthermore comprising a microcomputer, said computer program comprising instructions that, when they are executed on the microcomputer, implement the steps of a method according to claim 1.

7. A wireless telecommunications receiver designed to receive a digitally modulated single-carrier signal, said receiver comprising a processing chain comprising a matched filter designed to perform shaping filtering on the signal in the time domain and to operate at a frequency drx×B and a frequency equalizer designed to perform frequency equalization on the filtered signal and deduce the modulation symbols of the equalized signal and to operate at the frequency B, drx being strictly greater than 1;
   the receiver comprising, between the matched filter and the equalizer, a decimation block designed to decimate the filtered signal by a factor drx, said receiver being wherein the decimation block is designed to perform the following operations:
   i/ said decimation block is designed to extract, from a filtered signal frame:
      a first sequence of samples, said samples being samples for aiding the decimation and having the same power; and
      a second sequence of samples, said samples being the payload samples intended to be equalized;
   ii/ said decimation block is designed to estimate the variance in the power of each of the drx decimation phases of the first sequence of samples; to compare the estimated power variances with one another and identify the decimation phase associated with the minimum variance, said identified phase being the $n^{th}$ phase, with $n \in \{0, 1, \ldots ; drx-1\}$;

iii/said decimation block is designed to decimate the second sequence of samples by a factor drx, the samples at the sampling frequency equal to B and delivered at the output of said decimation step being those of the $n^{th}$ decimation phase of the second sequence;

iv/said decimation block is designed to supply, at the input of the frequency equalizer, said samples at the sampling frequency equal to B and delivered at the output of said decimation step.

8. The wireless telecommunications receiver according to claim 7, wherein the decimation block is designed to perform the operations in relation to each filtered signal frame.

9. The wireless telecommunications receiver according to claim 7, wherein the samples of the first sequence result from a digital modulation of a first type and the samples of the second sequence result from a digital modulation of a second type different from the first type.

10. The wireless telecommunications receiver according to claim 7, wherein the decimation block comprises:

a first processing sub-chain designed to receive, at input, the first sequence of samples of the frame, to compute the power of each of said samples, and then to distribute the sequence of resulting powers into drx sequences each corresponding to a decimation phase, to compute the variance of each sequence of powers and identify the decimation phase, phase number n, having the lowest variance;

a second processing sub-chain designed to receive, at input, the second sequence of samples of the frame, to distribute the second sequence into drx sequences each corresponding to a decimation phase, said second chain comprising a multiplexer designed to receive, at input, said drx sequences, designed to receive an identifier, n, supplied by the first processing sub-chain, and designed to select that one of said drx sequences, which will be supplied at the output of said decimation block to the equalizer, corresponding to decimation phase number n equal to the identifier supplied by the first processing sub-chain;

the first and second sequences being processed in parallel.

* * * * *